Feb. 23, 1943.    F. C. PEARSON    2,311,997
CLUTCH
Filed June 8, 1940    3 Sheets-Sheet 1

Inventor
Frank C. Pearson
By
Blackmore, Spencer & Clink
Attorneys

Feb. 23, 1943.　　F. C. PEARSON　　2,311,997
CLUTCH
Filed June 8, 1940　　3 Sheets-Sheet 3

Inventor
Frank C. Pearson
By Blackmor, Spencer & Flint
Attorneys

Patented Feb. 23, 1943

2,311,997

UNITED STATES PATENT OFFICE 2,311,997

CLUTCH

Frank C. Pearson, Flushing, Mich., assignor to General Motors Corporation, Detroit, Mich., a corporation of Delaware Application June 8, 1940, Serial No. 339,437

1 Claim. (Cl. 192—89)

This invention relates to a releasable clutch, such a clutch as is used to couple the engine shaft and the transmission shaft of a motor vehicle.

An object of the invention is to improve the means for positioning the pressure plate and for withdrawing it when the clutch is released.

It is also within the contemplation of the inventor to use an externally located spring to effect clutch engagement.

Other objects and advantages will be understood from the description which follows.

Figure 1:
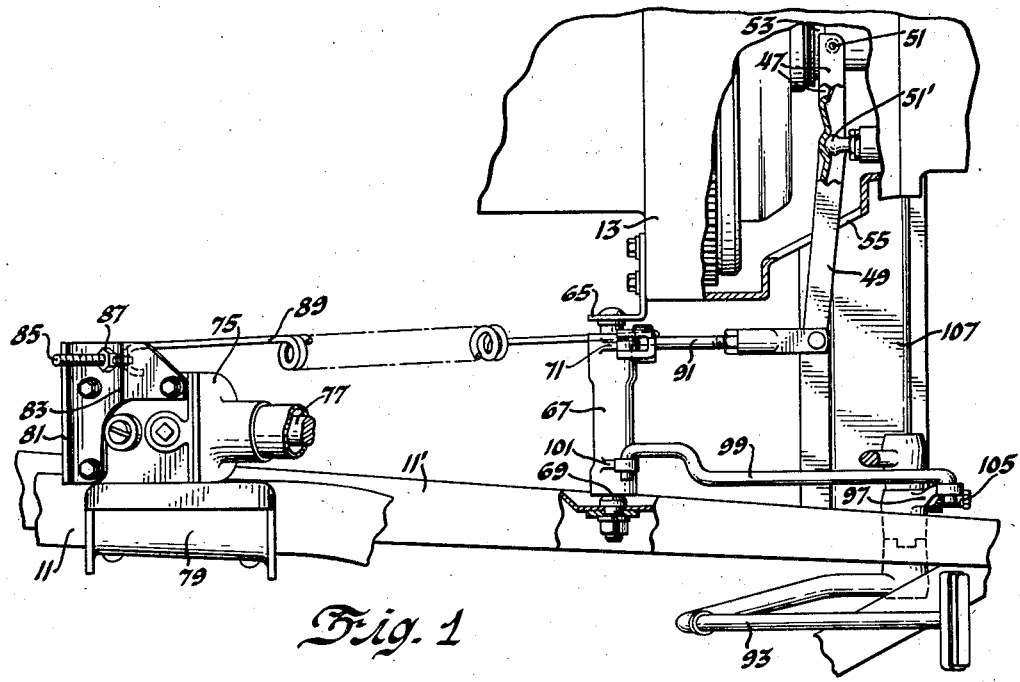
Figure 1 is a plan view, partly broken away and in section, of a part of a motor vehicle having my clutch embodied therein.
Figure 3:
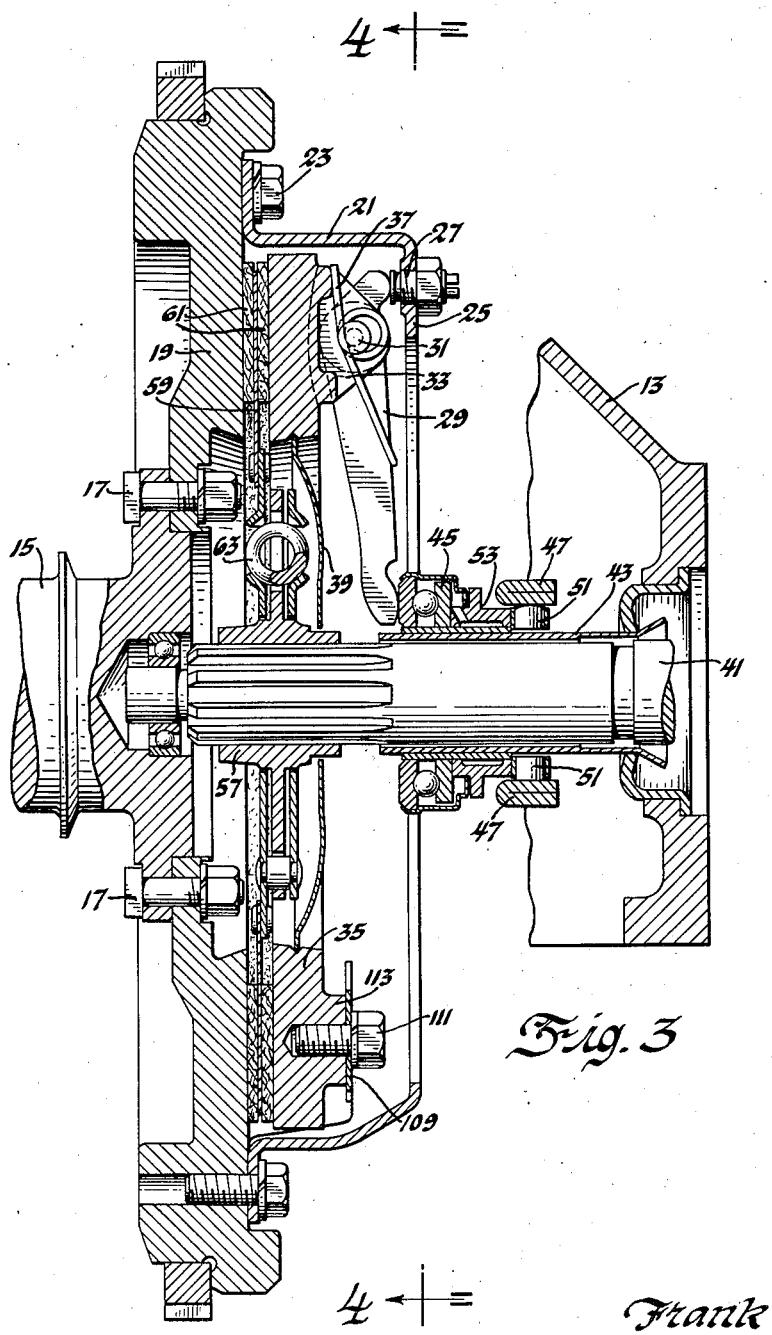
Figure 3 is a transverse section through the clutch.

Referring to the drawings, Figure 1 shows a vehicle frame 11. The clutch between the engine and the transmission is enclosed within a housing marked 13. The engine shaft 15 (see Figure 3) carries, secured thereto at 17, a flywheel 19. A cover 21 has a radial flange secured to the flywheel at 23. The bottom of the cover is spaced from the flywheel and has a large opening leaving merely a radially extending flange 25. To this flange 25 are secured adjustably a plurality of fulcrum studs 27 adapted to be engaged by levers 29, the latter being pivoted at 31 to arms 33 of a pressure plate 35. A spring marked 37 is used to prevent rattling and to retain pivot 31 as shown. The pressure plate may be provided with a centrally disposed disc 39 for the purpose of checking air flow through the clutch and to thereby prevent the passage of oil to the region of the clutch facings.

The driven shaft 41 is surrounded by a bearing sleeve 43. Surrounding the sleeve is an axially moving ball bearing 45. The ends 47 of a clutch lever 49 (see Figure 1) carry parts 51 which move the bearing through the instrumentality of an intermediate sleeve 53. The bearing engages the inner ends of levers 29. The clutch lever 49 is pivoted at 51' within the housing 13 and projects through an opening 55 in the housing.

The driven member of the clutch is carried by shaft 41 and is adapted to be gripped between the flywheel and pressure plate as is usual. This driven plate includes a hub 57 mounted to rotate with shaft 41 and an outer annulus 59 which carries the friction facings 61. If preferred, there may be used torque transmitting springs 63, as shown on the drawings, and operable between the hub and the annulus 59. As will be understood by reference to Figure 1, a counterclockwise rotation of clutch lever 49 moves bearing 45 toward the flywheel. This movement of the bearing rocks levers 29 which fulcrum at 27, the pressure plate being moved thereby toward the flywheel to grip the driven plate.

Figure 2:
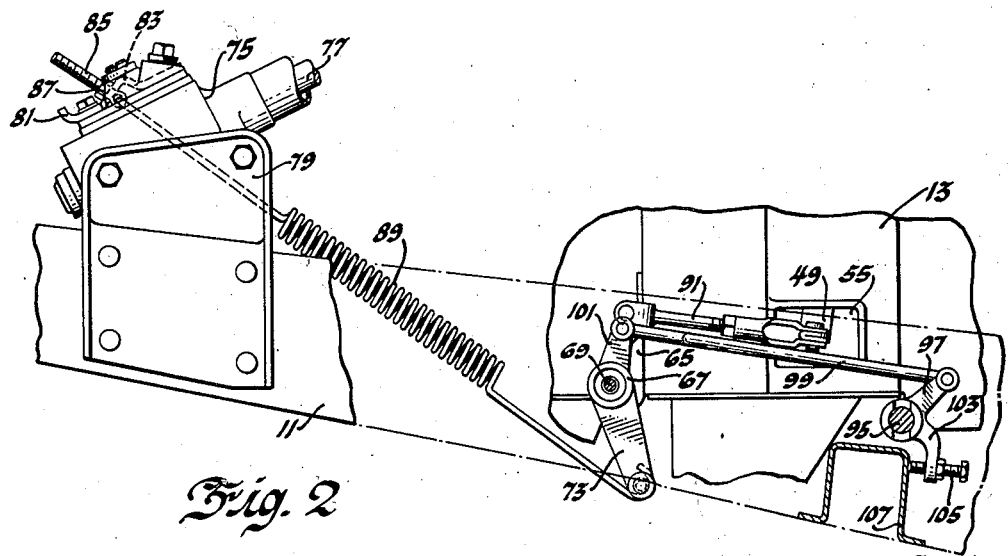
Figure 2 is a view in elevation of a part of the vehicle shown in Figure 1.

To produce the above described rotation of clutch lever 49 the following construction is used. Journaled for rotation on the engine and clutch housing 13 as at 65 is one end of a rockshaft 67. The outer end of the rockshaft is journaled at 69 to a part 11' of the frame 11. The engine end of the rockshaft 67 has an upwardly extending lever arm 71 and a downwardly directed arm 73. The gear box 75 which carries the gearing by which the steering shaft 77 operates, is secured by a bracket 79 to the frame 11. To the top of the gear box is secured a plate 81. Between its front and rear ends this plate has an angular portion 83 apertured for the passage of an eye-bolt 85 held in position by a nut 87. To the eye of the eye-bolt is secured one end of a clutch engaging coil spring 89. The other end of the coil spring is attached to the lever arm 73. A compression rod or link 91 connects arm 71 with the end of clutch lever 49. It will be seen that spring 89 operates to rotate rockshaft 67 clockwise as seen in Figure 2, and that a counterclockwise rotation (Figure 1) is imparted to clutch lever 49. This pushes the bearing 45 to the left and the pressure plate is moved by the levers 29 to grip the driven clutch member.

The pedal 93 is used to release the clutch. The pedal rotates about a shaft 95 carried by a conventional frame support. The pedal hub interlocks with the hub of a lever 97, the lever 97 being connected by a link 99 to an arm 101 extending upwardly from shaft 67 at a point adjacent the vehicle frame. The lever 97 may be formed with a depending part 103 carrying adjustably a threaded member 105 to engage a cross member 107 of the frame and to thereby limit the return movement of the pedal. When the pedal is depressed it operates through link 99 to rotate the rockshaft 67 in a counterclockwise direction.

This operates to pull the lever 49 against the action of the clutch engaging spring and serves to release the clutch.

Figure 4:
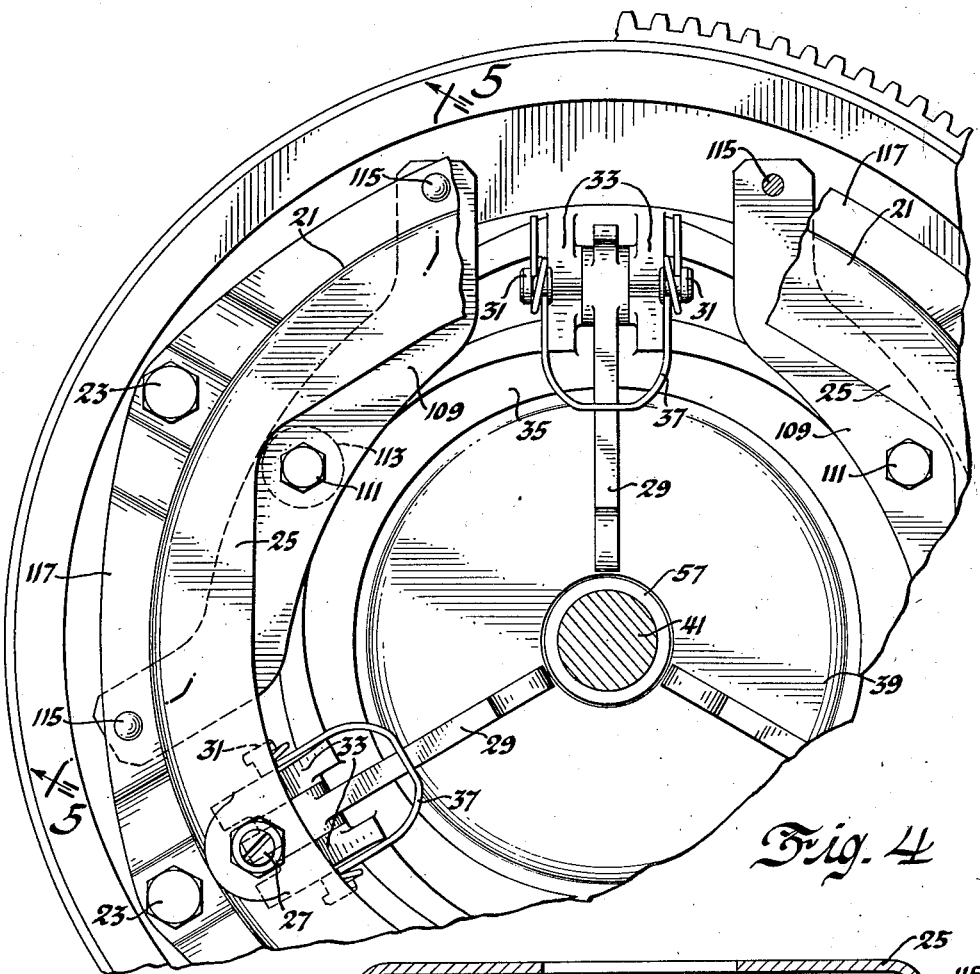
Figure 4 is a view as seen from line 4—4 of Figure 3.
Figure 5:
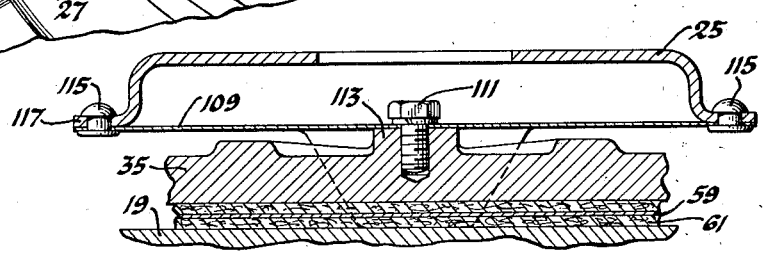
Figure 5 is a section substantially on line 5—5 of Figure 4.
Figure 6:
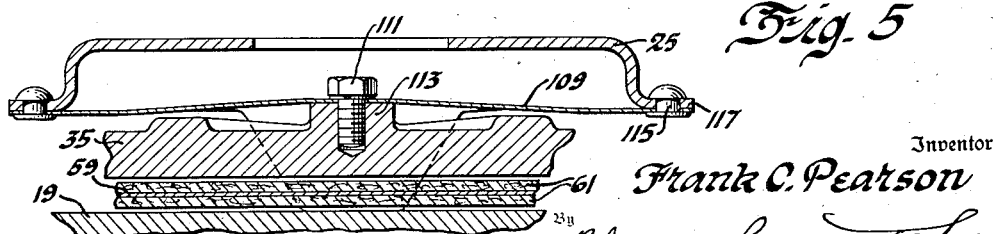
Figure 6 is a view like Figure 5 but with the parts displaced.

With this arrangement for clutch release, some means should be provided to move the pressure plate away from the flywheel when the clutch pedal overcomes the clutch engaging spring 89. In the present construction this means takes the form of a plurality of resilient flat plates, which plates have the added function of transmitting torque between the flywheel and cover assembly and the pressure plate. They also have the further function of centering the pressure plate. Because of this provision, any friction between the flywheel and cover assembly and the pressure plate is avoided. The expedient is best shown in Figure 4 where one of the resilient plates serving to center the pressure plate and to effect its release is marked 109. This spring plate is attached at about its middle point by fastening means 111 to a lug 113 of the pressure plate. The spring plate extends in both directions from 113 and forms what is substantially a chord of the circle of the clutch. The ends of the plate are bent away from the chordal direction and become more nearly radial. These ends are attached by fastening means 115 to the under surface of flanges 117 formed on parts of the cover, which parts are spaced axially from the flywheel and circumferentially from the cover fastening means 23. The plates 109 in their preferred form are normally bent or twisted when not loaded, the bend being preferably in the region where the chordal and radial regions merge. They are flexed to a flat condition when the clutch is engaged. These two positions, engaged and disengaged, are shown by Figures 5 and 6. It will be understood that resilient energy is stored in the spring members 109 (of which there may be three as suggested by Figure 4) when the clutch is engaged, which energy is available to move the pressure plate away from the flywheel when the greater force of the clutch engaging spring 89 is overcome by the depression of the clutch pedal.

The avoidance of the sliding of the pressure plate in contact with the cover which is a commonly employed construction does away with friction and the centering of the pressure plate is assured. The construction provides a large central opening since the cover is not used as an abutment for the packing springs. The region of the cover periphery between its points of attachment to the flywheel is spaced axially from the flywheel. This is best shown by Figures 5 and 6, these figures indicating the cover outline. It shows the cover as extending downwardly (see dotted lines) to its points of attachment at 23 to the flywheel 19. The openings thus provided give a better air circulation than is usual and thus tend to avoid overheating of the friction facings.

I claim:

In a clutch for engine driven vehicles having a vehicle frame, an engine housing and a transversely disposed rockshaft with its ends supported adjacent the vehicle frame and the engine housing, said rockshaft having first and second oppositely directed arms, a single spring to effect clutch engagement, said spring having one end fixedly anchored and its other end attached to the first of said arms, a clutch lever, a link connecting the second arm with the clutch lever, said rockshaft having a third arm extending in the same direction as the second arm, a manually operable lever and means connecting said manually operable lever and said third arm, said first and second arms being at the engine end of the rockshaft and the third arm being at the other end of the rockshaft.

FRANK C. PEARSON.